United States Patent [19]

Savage

[11] 4,032,764

[45] June 28, 1977

[54] MEANS AND METHOD FOR GENERATING PERMUTATIONS OF A SQUARE

[76] Inventor: John E. Savage, 65 Humboldt Ave., Providence, R.I. 02906

[22] Filed: Dec. 1, 1975

[21] Appl. No.: 636,810

[52] U.S. Cl. .......................... 235/152; 273/138 A; 273/139; 328/59; 331/78; 340/323 R; 340/347 DD
[51] Int. Cl.² ..................... G06F 1/02; G07C 15/00
[58] Field of Search .............. 235/152; 273/138 A, 273/139; 331/78; 328/59; 340/323 R

[56] References Cited

UNITED STATES PATENTS

| | | | |
|---|---|---|---|
| 3,171,082 | 2/1965 | Dillard et al. | 235/152 |
| 3,653,026 | 3/1972 | Hurly | 340/323 R |
| 3,761,696 | 9/1973 | Russell | 235/152 |
| 3,895,807 | 7/1975 | Friedman | 273/138 A |

*Primary Examiner*—R. Stephen Dildine, Jr.
*Attorney, Agent, or Firm*—Charles E. Temko

[57] ABSTRACT

A means and method for generating random permutations on a square having $k^2$ subsquares based upon a circuitry including a maximal-length sequence generator.

2 Claims, 7 Drawing Figures

4,032,764

MEANS AND METHOD FOR GENERATING PERMUTATIONS OF A SQUARE

BACKGROUND OF THE INVENTION

For many applications, including the generation of random number tables for games of chance, it is desirable to have ready availability of random permutations on a square. While this can be done in a completely manual fashion, where large numbers of such game cards are required, the obtaining of data by wholly mental steps is time consuming and fraught with the possibility of error. Random number generators are known in the art, but most simple random number generators have no means for preventing duplication of previously obtained numbers over a given number of cycles.

SUMMARY OF THE INVENTION

Briefly stated, the invention contemplates the utilization of a type of linear feedback shift-register known as a "maximal-length sequence generator" in combination with other circuitry to obtain integers within a desired value range with the assurance that duplication is avoided over a given number of cycles.

DISCUSSION OF APPLICABLE MATHEMATICAL THEORY

Before entering into a detailed consideration of the disclosed embodiments of the invention, a discussion of the mathematical theory involved is considered apposite.

Figure 1:
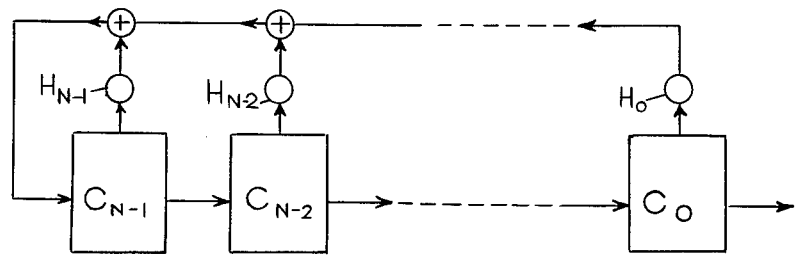
FIG. 1 is a schematic representation of a known linear feedback shift-register.

Consider a binary linear feedback shift-register (LFSR) shown in FIG. 1. Here $h_{n-1}, h_{n-2}, \ldots, h_o$ are 0 or 1. The contents of all cells are 0 or 1 and those for which $h_i = 1$ are added modulo-2 and the sum is used to replace the contents of cell $c_{n-1}$ after a shift right which replaces $c_i$ with $c_{i-1}$ for $0 \leq i \leq n-2$.

Figure 2:
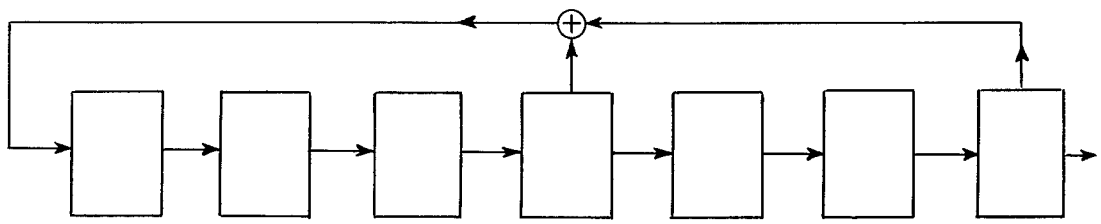
FIG. 2 is a schematic view of a known maximal-length feedback shift-register.

We associate with the shift-register the characteristic polynomial $h(x) = x^n + h_{n-1} x^{n-1} + h_{n-2}x^{n-2} + \ldots + h_1 x + h_o$. There are special such polynomials which are known as "primitive polynomials." These are the minimal polynomials of primitive elements of a Galois field of size $2^n$. When such polynomials are used to define a shift-register, the register has the property that when initialized with any binary $n$-tuple (its state) other than 0 it will cycle through $2^n - 1$ different states before returning to the original $n$-tuple. Such registers are called "maximal length sequence generators" and are well known in the art. The register shown in FIG. 2 is of this type and will cycle through $2^7 - 1 = 127$ different, non-zero states before repeating a state. It has $h(x) = x^7 + x^3 + 1$.

Permutations of a Square

Figure 3:
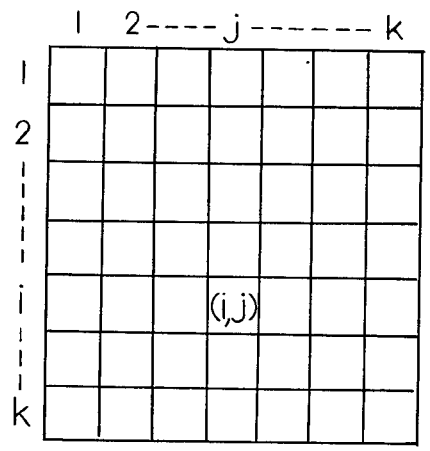
FIG. 3 is a schematic view of a typical square having a given number of subsquares to be randomly numbered.

Consider a square which is divided into $k^2$ subsquares as shown in FIG. 3. The rows and columns are numbered as shown, and a square in the $i$ th row and $j$ th column are identified by the pair $(i, j)$. The $k^2$ squares can be ordered by rows, columns, diagonally and many other ways. Ordered by rows they are $(1, 1), (1, 2), \ldots, (1, k), (2, 1), \ldots, (2, k), \ldots (k, 1), \ldots, (k, k)$. By columns they are $(1, 1), (2, 1), \ldots, (k, 1), (1, 2), (2, 2), \ldots, (k, 2), \ldots, (k, k)$. Other orderings can be obtained by reversing the order of rows, of columns or both. In a diagonal ordering, the squares are ordered from left to right on consecutive diagonals starting from $(1, 1)$, that is, $(1, 1), (2, 1), (1, 2), (3, 1), (2, 2), \ldots, (k, k)$.

A Procedure for Generation of "Random" Permutations of a Square

There follows a procedure for generating a permutation of the pairs $(i, j)$, where both $i$ and $j$ are greater than or equal to 1. The procedure is given for 1 is less than or equal to $k$ which is less than or equal to 9 but can be generalized to any value of $k$.

1. Choose a value of $n$ greater than or equal to 7.
2. Choose a primitive binary polynominal $h(x)$ of degree $N-1$.
3. Construct an $n$-stage LFSR with characteristic polynominal $h(x)$.
4. Choose an initial state for the shift-register. (This is easily done with $n$ switches.)
5. Choose a set of 7 stages from the $n$ stage register and associate the numbers 1, 2, 4, 8, 16, 32, 64 in some order with these stages.
6. Beginning with the initial state, cycle until a state is found which has 0's in every position (if any) except the 7 chosen positions. Call such a state a satisfiable state. [A satisfiable state is represented by the integer obtained by adding the powers of 2 for those stages containing 1. For example, if in FIG. 2 we associate 1 with the rightmost stage, 2 with the next and 64 with the leftmost and the shift-register contains 1100010, then this state is represented by the integer 98.]
7. A satisfiable state is tested to determine whether its representing integer is a two digit decimal number of the form $ij$ where $i$ and $j$ are both greater than or equal to 1 and less than or equal to $k$. Such states are called acceptable states.
8. Steps 6 and 7 are repeated until $k^2$ acceptable states are found.

The decimal numbers associated with the $k^2$ acceptable states generated by this procedure are distinct and represent a permutation of the pairs in $(i, j)$ where both $i$ and $j$ are greater than or equal to 1 and less than or equal to $k$.

By the choice of the minimal polynomial, the state of the LFSR runs through all non-zero binary n-tuples before repeating. It therefore runs through all non-zero tuples with 0 in all but the 7 chosen positions and in these positions it runs through all $2^7 - 1 = 127$ different non-zero patterns of seven digits. The assigning of powers of two to these positions generates integers which range from 1 to 127. Therefore, all pairs of non-zero decimal digits are generated. The selection procedure chooses just those pairs which correspond to pairs in $(i,$ j) where both $i$ and $j$ are greater than or equal to 1 and less than or equal to $k$.

To generate a permutation of the $k \times k$ square a. order the $k^2$ subsquares of the square by rows, or by columns (and by inverting the order on rows or columns or both) or diagonally.

b. in such an ordering, assign to each subsquare a pair of digits produced by the above procedure in the order in which they are produced.

As an example, consider the maximal length linear feedback shift-register shown in FIG. 2. Here a. $n = 7$ b. $h(x) = x^7 + x^3 + 1$ Also, assign the powers of 2 in order from right to left so that the rightmost cell is assigned $2^0 = 1$ and the leftmost is assigned $2^6 = 64$. Initialize the shift-register with 1100010. The first pair of decimal digits produced is 98 and the last before repeating is 69. When $k = 9$ and the subsquares are ordered according to rows, the resulting permutation is one which can be employed with a Bingo-type playing card or similar device.

DETAILED DESCRIPTION OF THE DISCLOSED EMBODIMENT

Figure 5:
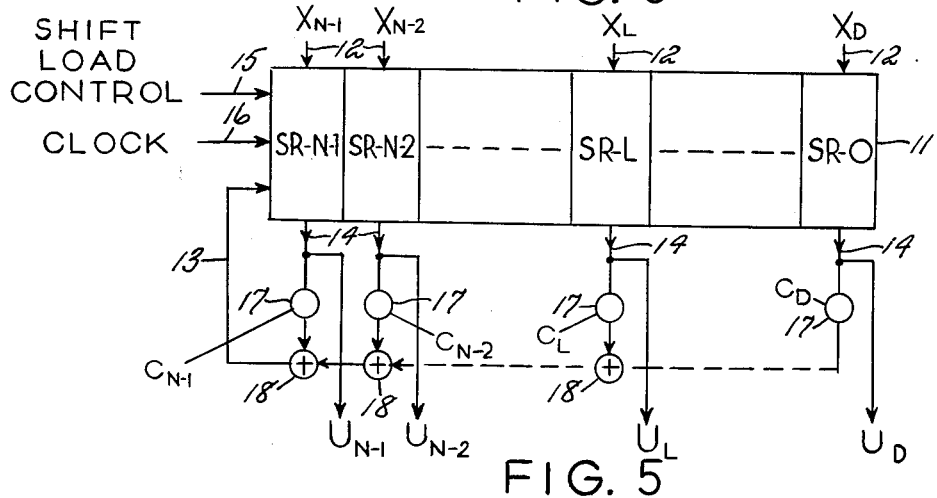
FIG. 5 is a generalized block diagram of a basic permutation generator forming a part of the embodiment.

FIG. 5 depicts the basic generator of permutations. The basic generator is a linear sequential filter with a plurality of feedback paths between selected time-spaced taps thereon and its input. The input is the modulo-2 sum of the feedback components.

The basic generator comprises a plurality of N stages of delay represented here by a shift-register 11 with N stages SR-0 through SR-(N−1), a plurality of N parallel inputs 12 and a serial input 13. It has a plurality of N parallel outputs 14 and a control input 15, which, when 0, permits the parallel transfer of the N parallel inputs to the N stages and which, when 1, permits transfer of the serial input 13 into stage SR-(N−1). These transfers occur when the clock input 16 makes a transition from 0 to 1. The basic shift-register can be assembled from 4-bit parallel-access shift-registers which are commercially available. The filter also contains N multipliers 17 and factors $c_0$ through $c_{N-1}$ at taps on register 11, and a plurality of modulo-2 adders 18 connected in tandem between multipliers 17 and the serial input 13.

The basic generator of FIG. 5 has been analyzed in terms of the number of stages N and the multiplicative factors $c_0$ through $c_{N-1}$. A tap polynomial $h(x)$ may be written as $$h(x) = x^N + c_{N-1} x^{N-1} + \ldots + c_0 \qquad (1)$$

In equation 1 the powers of $x$ identify the taps from the input of stage SR-(N−1) to the output of stage SR-0. The serial input corresponds to the coefficient of $x^N$ which is 1. At all other taps, the $c_j$ coefficients are chosen from 0 or 1, to make the polynomial in Equation 1 primitive over the field of two elements. A polynomial is primitive if it is irreducible, i.e. has no factors but itself and 1, and divides $x^m + 1$ for $m = 2^n - 1$ but for no smaller $m$. Tables of primitive polynomial coefficients are known in the art, and may be generated by known computer techniques. (See footnote 1)

1. Tables of these polynomials for $n \leq 100$ can be found in a paper by E. J. Watson, *Mathematics of Computation*, Vol. 16, 1962, pp. 368–389.

Basic generators of N stages have the following property that when initialized with a non-zero state ($x_{N-2}, X_{N-2}, \ldots, x_0$) and when the state is advanced by pulsing the clock input 16 exactly $2^N - 1$ advances are necessary to return the state to the initial state. Furthermore, all of the possible non-zero states will appear before the initial state is encountered. If the initial state is the zero state $(0,0, \ldots ,0)$, the basic generator remains in the state after each pulsing of the clock input.

There are eighteen choices of coefficients that will render a seventh-degree polynomial $h(x)$ primitive. A choice with the minimun number of coefficients is $$h(x) = x^7 + x^3 + 1 \qquad (2)$$

Equation 2 defines a basic generator with seven stages SR-0 through SR-6, a modulo-2 adder 18 having inputs from stages SR-0 and SR-3 through multipliers of unity gain at $c_0$ and $c_3$ and an output connected to the serial input 13, (see FIG. 2).

Figure 4:
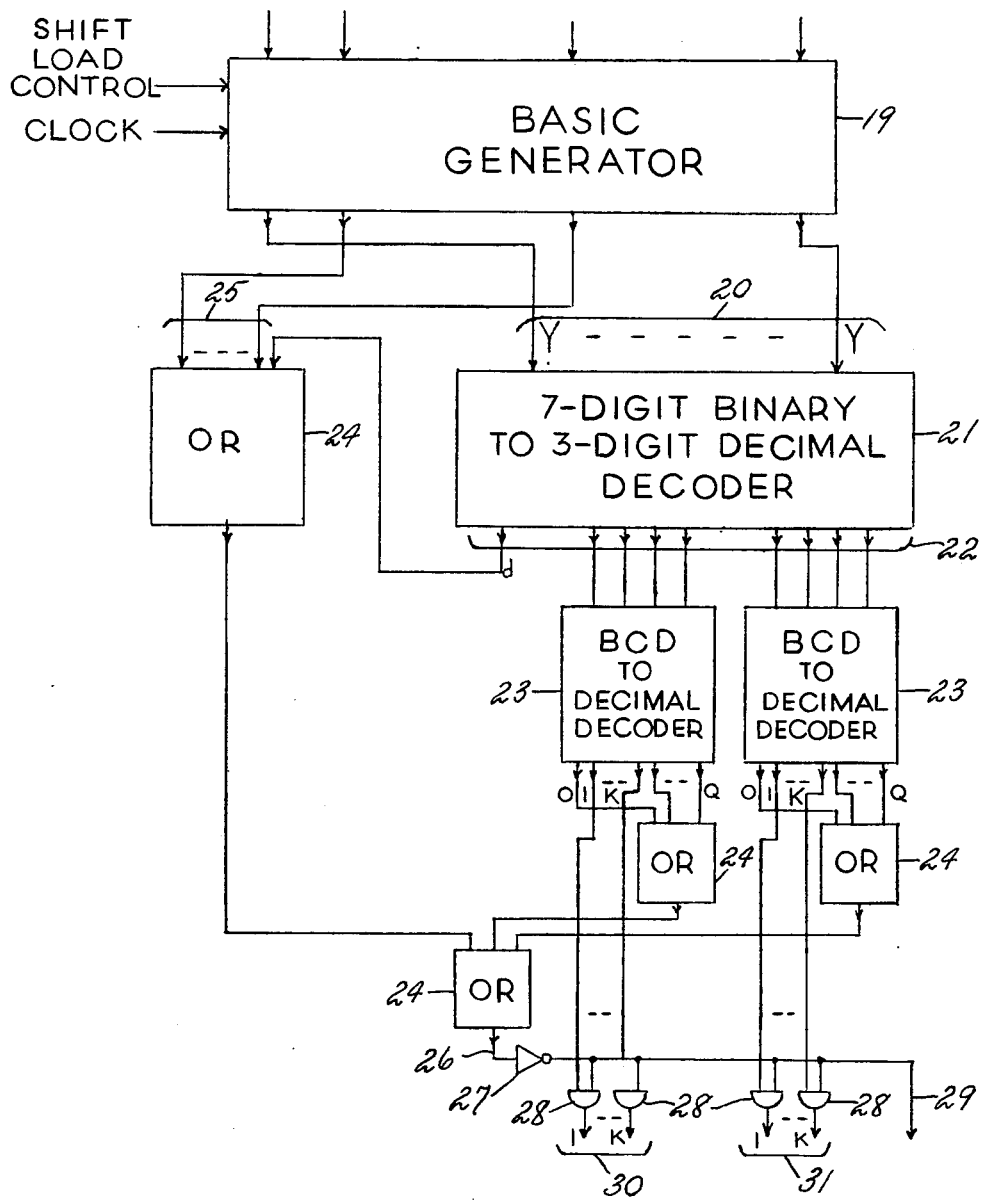
FIG. 4 is a block diagram of an embodiment of the invention.

FIG. 4 depicts the generator for permutations of the square. A set of seven stages on the basic generator 19 is chosen in some order and the outputs 20 are applied as input to 21 which is a circuit which decodes the seven digit binary number into a three digit decimal number. The three digit decimal number 22 is represented as three numbers in binary-coded decimal (BCD). These numbers in BCD are $(d_{03}, d_{02}, d_{01}, d_{00})$, $(d_{13}, d_{12}, d_{11}, d_{10})$ and $(d_{20})$ and are the coefficients of 1, 10 and 100 respectively, in the decimal representation of the binary number $(y_6, y_5, y_4, y_3, y_2, y_1, y_0)$. The first two BCD numbers 22 are supplied as input to standard BCD to decimal decoders 23 each of which has ten outputs labeled $0, 1, 2, \ldots, 9$. Exactly one output of each BCD to decimal decoder 23 is 1 on a given input and the remaining outputs are 0.

Four OR circuits 24 are depicted in FIG. 5 and each forms the logical OR of all its inputs. One OR 24 has as inputs those parallel outputs 25 of the basic generator which are not used as inputs to the decoder 21, (if the number of stages N=7, there are no outputs 25) and the BCD number $d_{20}$ in 22 which is the coefficients of 100 in the decimal expansion of the binary number $(y_6, y_5, y_4, y_3, y_2, y_1, y_0)$. The outputs of three OR's are combined in the fourth OR whose output 26 is 0 only when all inputs to all OR's are 0. This occurs exactly when the BCD number $(d_{13}, d_{12}, d_{11}, d_{10})$ and $(d_{03}, d_{02}, d_{01}, d_{00})$ lie between 1 and $k$ ($k \leq 9$) and the BCD number $d_{20}$ is 0 and the N − 7 outputs 25 are exactly 0.

One consequence of these conditions is that the decimal number representing the binary number $(y_6, y_5, y_4, y_3, y_2, y_1, y_0)$ is a pair $i,j$ where $i$ and $j$ lie between 1 and $k$ and where the number has value $i \cdot 10 + j$.

The output 26 is complemented by the inverter 27 and supplied as input to the AND gates 28 and to the output 29. Only one output in each group of outputs 30 and 31 is 1 and this occurs when the corresponding output of the BCD to decimal decoder 23 is 1 and the above stated conditions apply. When an output in 30 and 31 is 1, it denotes an integer $r$ between 1 and $k$ where $k \leq 9$.

By the property cited above for the basic generator, the permutation generator of FIG. 4 will produce outputs at 30 and 31 which denote integers $i$ and $j$, respectively, and all possible pairs $(i,j)$ where $i$ and $j$ lie between 1 and $k$, will be produced by advancing the clock at most $2^N - 1$ times. Each time that such a pair is produced, the output 29 has value 1. The outputs at 29, 30 and 31 can be used to drive some form of display or recording device, (not shown).

Figure 6:
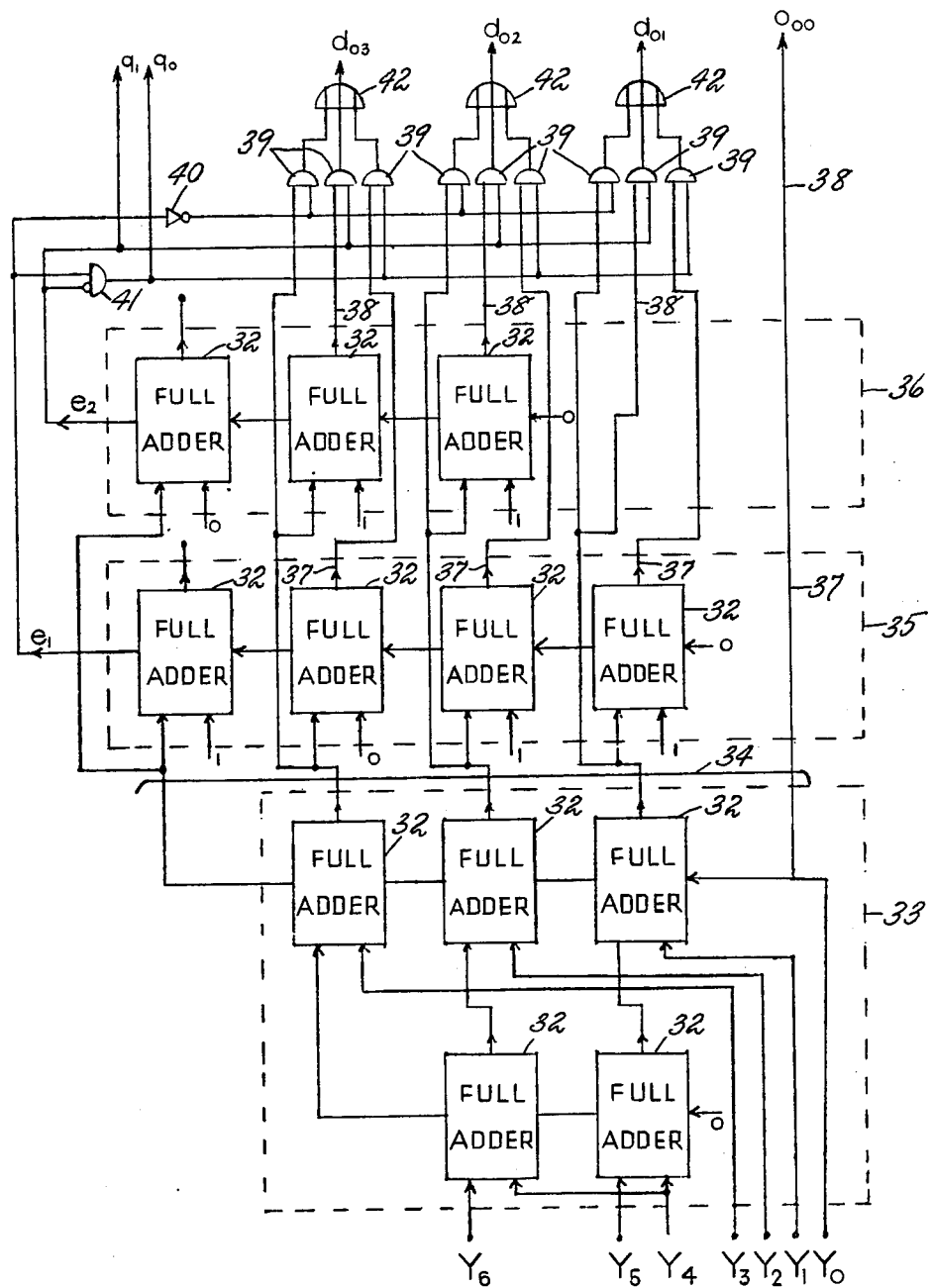
FIG. 6 is a block diagram of a portion of a circuit comprising a part of the embodiment.

FIG. 6 depicts a circuit which produces the BCD number $(d_{03},d_{02},d_{01},d_{00})$ mentioned above and a pair of digits $(q_1,q_0)$ which are used to produce the two remaining BDC numbers. The number P associated with the binary number $(y_6,y_5,y_4,y_3,y_2,y_1,y_0)$ is given by $$P = y_6 \cdot 64 + y_5 \cdot 32 + y_4 \cdot 16 + y_3 \cdot 8 + y_2 \cdot 4 + y_1 \cdot 2 + y_0 \cdot 1 \quad (3)$$

Equation 3 shows P as a sum of those decimal numbers whose multipliers $Y_j$ are 1. The "units" of the number P are the "units" of the number Q given by $$Q = Y_6 \cdot 4 + Y_5 \cdot 2 + Y_4 \cdot 6 + Y_3 \cdot 8 + Y_2 \cdot 4 + Y_1 \cdot 2 + Y_0 \cdot 1 \quad (4)$$

This number is obtained by representing 1,2,4,6,8, in BCD and forming the sum of the following binary numbers $$(0,Y_6,0,0)\ (0,0,Y_5,0)\ (0,Y_4,Y_4,0)\ (Y_3,Y_2,Y_1,Y_0) \quad (5)$$

The sum of the first two binary numbers in Equation 5 is $(0,Y_6,Y_5,0)$.

The circuit of FIG. 6 contains 12 full adders 32. A combination of five full adders in 33 forms the binary sum of the three binary numbers $(0,Y_6,Y_5,0)$, $(0,Y_4,Y_4,0)$ and $(Y_3,Y_2,Y_1,Y_0)$. The result of the sum 34 (Q of Equation 4) is supplied to the adder chains 35 and 36. In 35 the decimal number 10 is substracted from the sum 34 by adding the two's complement of $(0,1,0,1,0)$, namely $(1,0,1,1,0)$. The overflow signal $e_1$ is 1 only if Q is 10 or larger and if Q is less than 20, 35 yields the BCD representation 37 of the units of Q. In 36 the decimal number 20 is subtracted by adding the two's complement of $(1,0,1,0,0)$, namely $(0,1,1,0,0)$. The overflow signal $e_2$ is 1 only if Q is 20 or larger and in this case 36 yields as output the BCD representation 38 of the units of Q.

The AND gates 39 are used to select the units of Q. When $e_1$ is 0 and the output of the inverter 40 is 1, the output of 33 is chosen. In this case Q is less than 10. The output of 35 is chosen if $e_1$ is 1 and $e_2$ is 0, that is, the output of 41 is 1. In this case Q is between 10 and 19. Also, the output of 36 is chosen when $e_2$ is 1. In this case, Q is 20 or greater. The OR gates 42 combine the outputs from the AND's 39.

The pair $(q_1,q_0)$ represents in binary the number of "tens" in Q.

The number of tens in P is the number of tens in Q plus the number in $y_1 \cdot 6$, $y_5 \cdot 3$, $y_4 \cdot 1$ which are the tens of the integers $y_6 \cdot 64$, $y_5 \cdot 32$, and $y_4 \cdot 16$. In binary these numbers are $$(0,q_1,q_0),\ (y_6,y_6,0),\ (0,y_5,y_5),\ (0,0,y_4) \quad (6)$$

Thus, the numbers of "tens" in P is the sum of these four binary numbers which is equivalent to the sum of the following three binary numbers $$(0,q_1,q_0),\ (0,y_5,y_5),\ (y_6,y_6,y_4) \quad (7)$$

Figure 7:
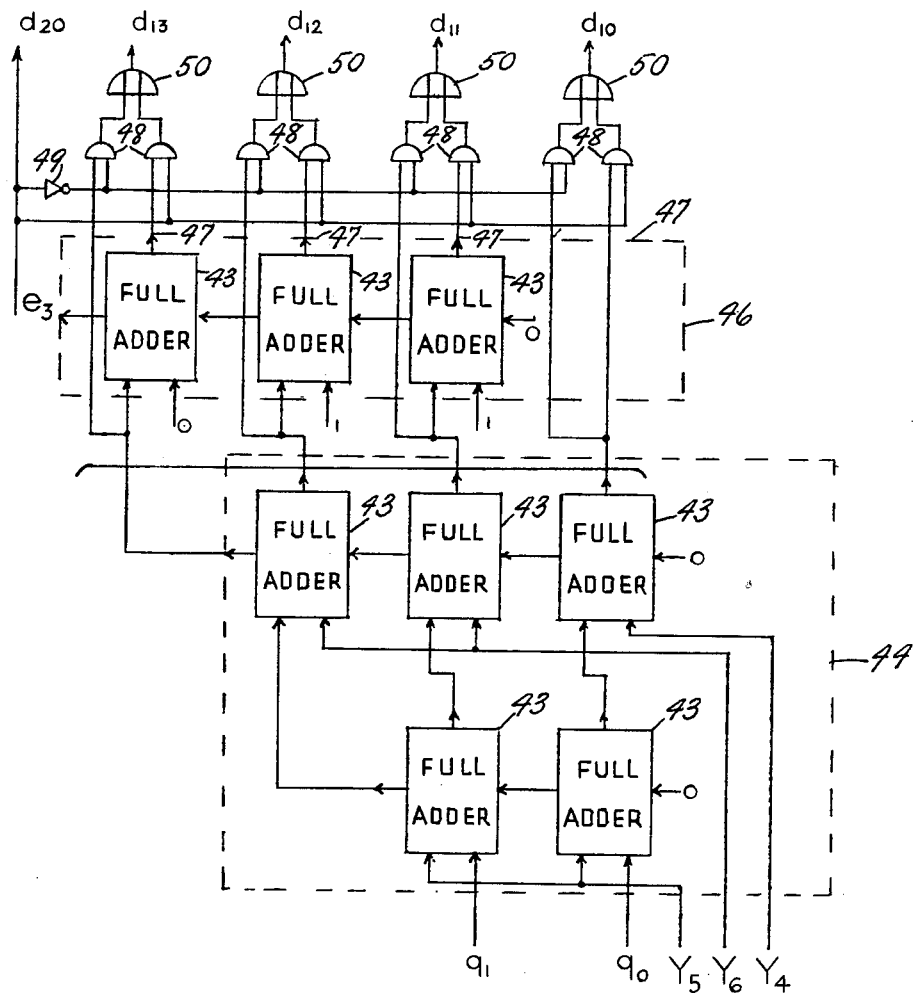
FIG. 7 is a block diagram showing a remaining portion of a circuit comprising a part of the embodiment.

FIG. 7 depicts a circuit for computing the number of tens and hundreds in P. Eight full adders 43 are used. In 44 the sum of the three binary numbers in Equation 7 is formed. The result 45 is then supplied to an adder 46 that subtracts the decimal number 10 by adding the two's complement of $(1,0,1,0)$, namely, $(0,1,1,0)$. The result 47 is the tens of P if $e_3$ is 1, that is, if the sum 45 is greater than or equal to 10. Otherwise, that is, when $e_3$ is 0, the tens of P is 45. If $e_3$ is 1, P is greater than or equal to 100. Therefore, $d_{20}$ is equal to $e_3$.

The AND gates 48 select the result 45 is $e_3$ is 0, in which case the output of the inverter 49 is 1, and the result 47 is selected if $e_3$ is 1. The OR gates 50 combine the results.

The values of $(i,j)$ are random and non-repetitive for the pre-determined given number of cycles, and may be used to number the squares $k^2$ in any order desired.

I wish it to be understood that I do not consider the invention limited to the precise details of structure shown and set forth in this specification, for obvious modifications will occur to those skilled in the art to which the invention pertains.

I claim:

1. A device for generating permutations of a square having $k^2$ subsquares by generating values of the pairs $(i,j)$ where both $i$ and $j$ are greater than or equal to 1 and equal to or less than $k$, comprising: a basic generator including a maximal length shift-register having a series of inputs corresponding to the characteristic polynomial $h(x) = x^n + h_{n-1}x^{n-1} + h_{n-2}x^{n-2} + \ldots + h_1 x + h_0$, said register having the properties that when initialized with any binary $n$-tuple other than 0 it will cycle through $2^n - 1$ different states before returning to said $n$-tuple; a binary to decimal decoder having at least a 7 digit binary input recieivng the output of said maximal length shift-register, and at least a 3 digit decimal output in binary coded decimal form; first and second binary coded decimal to decimal decoders receiving the output of 2 of said 3 digit output, a first OR gate receiving the output of the remaining third and other of said at least 3 digit output; and second and third OR gates receiving the outputs, respectively, from said first and second binary coded decimal to decimal decoders, a fourth OR gate receiving the output of said first, second and third OR gates such that the output of the same is zero only when all inputs to said second and third OR gates are zero; and a plurality of AND gates sensing the output of said fourth OR gate and outputs of both of said first and second binary to decimal decoders; said AND gates having a 1 output denoting an integer between 1 and $k$.

2. A method of obtaining random permutations of a square which is divided into $k^2$ subsquares in which the rows and columns identify a square in the $i$ th row and $j$ th column by the pairs $i,j$, comprising the steps of:
  1. Selecting a value of $n$ equal to or greater than the number of subsquares;
  2. Selecting a primitive binary polynomial $h(x)$ of degree $n$;
  3. Providing an n-stage linear feedback shift-register with characteristic polynomial $h(x)$;
  4. Selecting an initial state for the shift-register;
  5. Selecting a set of $r$ stages from said $n$ stage register and associating the numbers 1, 2, 4, 8, 16, 32, 64 . . . in a given order with these stages, $r \geq 7$;
  6. Beginning with the initial state, cycling said register until a state is found which has 0's in every position except the chosen $r$ stages, in which said state is represented by the integer obtained by adding the powers of 2 for those stages containing 1;
  7. Testing said state to determine whether its representing integer is a 2 digit decimal number of the form $i,j$ where both $i$ and $j$ are greater than or equal to 1 and less than or equal to $k$;
  8. Repeating steps 6 and 7 until $k^2$ representing integers are found.

* * * * *